Patented Aug. 13, 1935

2,011,400

UNITED STATES PATENT OFFICE 2,011,400

PROCESS OF TREATING ZINCIFEROUS IRON ORES

Fritz Eulenstein, Cologne-on-the-Rhine, and Adolf Krus, Sturzelberg uber Neuss, Germany, assignors to "Sachtleben" Aktiengesellschaft für Bergbau und Chemische Industrie, Cologne-on-the-Rhine, Germany, a corporation of Germany No Drawing. Application October 18, 1933, Serial No. 694,194. In Germany October 17, 1932.

7 Claims. (Cl. 75—28)

This invention relates to a process of treating zinciferous iron ores, especially residues from Meggen pyrites.

The residues of Meggen pyrites contain an average of some 8% of zinc, which is present in the form of oxides and sulphides in about equal proportions. After dead-roasting on Dwight-Lloyd apparatus or on other sintering or blast roasting apparatus, nearly the whole zinc content is present in the form of oxides.

It has already been attempted to extract the zinc and sulphur contents from zinciferous iron ores, as for example calcined pyrites, by treating them successively in a series of rotary furnaces before smelting them in the blast furnace. In the first of these furnaces, which was heated externally, the material was desulphurized by means of cold or hot air, whilst the zinc extraction was effected in the second furnace, where the ore was kept in immediate contact with the combustion gases of a burner positioned in the lower part of the rotary furnace, the waste gases of the latter being used as the heating medium for the first revolving tube. The material withdrawn from these furnaces in liquid or paste form could then be agglomerated in a further revolving tube, by adding fine ore or flue dust. Whilst the removal of zinc and sulphur was not thoroughly satisfactory yet the extraction proved amply sufficient to render the ore suitable for treatment in blast furnace plants. It is to be noted that this process involves high installation and working costs.

Furthermore it has been contemplated to make use of ores containing zinc and sulphur, e. g. calcined pyrites, by way of direct reduction of iron, the separation of the zinc and iron being effected by heating the finely ground and roasted ore with reducing gases or coal to temperatures not in excess of those at which iron, but not zinc is reduced. After reduction, the material was cooled down in a reducing atmosphere, and the cold material was decomposed, by dressing, into reduced sponge iron and residues with a high zinc content, suitable for the zinc reduction furnace. Residues of zinciferous pyrites have been melted down, too, in an electrical furnace and it has been tried to separate from them firstly the sulphur by blowing in air, and then the zinc in a metallic condition by introducing reducing gases, for example coal gas, reducing the iron simultaneously with the zinc. From this latter process no good zinc yields and no slag free from zinc may be expected. Furthermore the method is too expensive, whilst the first-mentioned process is burdened with the well-known drawback of sponge iron production. Moreover, the separation of zinc and iron is likely to prove unsatisfactory with both processes.

The disadvantages inherent in the processes known heretofore are overcome by the present invention, which provides for the following method of treating the residues of Meggen pyrites and like material.

Firstly these residues are dead-roasted and then, after adding reducing agents and fluxes, such as lime, the dead-roasted material is melted down in single charges in a rotary, preferably a reverberatory furnace, in such a way that both the iron and the zinc are reduced. The zinc, which escapes during the reaction in form of zinc vapour, is taken up by the combustion gases of the furnace and is thus oxidized again. The zinc oxide can be recovered from the furnace gases in the well-known manner. The iron contained in the charge is tapped from the furnace in molten form, as iron or steel.

As distinguished from known processes working with the use of rotary, drum, or reverberatory furnaces, the present invention provides for a discontinuous zinc extraction from the residues and thus insures that this extraction interferes in no way with the iron reduction.

Therefore, under the present invention, the use of a moving furnace is not intended to combine reduction with transport of material, that is to say to make the process cheaper through continuous working, but aims rather at exploiting the motion of the furnace, or more correctly of its contents, only for the promotion of, firstly, the reaction which produces the slag, which protects the reduced iron while the iron is being melted down, and secondly and more particularly, the reduction of the zinc content by frequently exposing the zinc ore particles to the attack of the reducing gases and of the solid reducing agent.

In view of the present depression of zinc and iron prices, it is only a combination of the two reactions of these metals that can afford the possibility of economical zinc recovery together with a utilization of the iron contents. The great advantages of working continuously offered by known processes of zinc extraction, which however are not combined directly with the recovery of iron can, when working according to the invention, readily be dispensed with, for the combination or rather the simultaneous carrying out of both processes in the same discontinuous operation offers quite extraordinary advantages.

The reduction may be effected in a moving, e. g. a rotary furnace in the presence of slag-forming material, e. g. by regulating the carbon and the silicic acid contents of the charge in such a manner that with continually rising temperature at first metallic iron and ferrous oxide silicate slag are formed simultaneously, and that later on the iron is melted and during melting of the iron the ferrous oxide silicate slag is decomposed by the lime and the ferrous oxide formed hereby is reduced to the metal state. Other processes of direct iron reduction, in which molten iron or steel and a molten slag are obtained, are, however, also feasible, although with less satisfactory results.

In carrying the invention into practice, satisfactory results have been obtained in treating iron pyrites from the Meggen deposits. The following is an average composition of the Meggen pyrites:—

|  | Percent |
|---|---|
| Sulphur | 42–43 |
| Zinc | 7– 8 |
| Iron | 34 |
| Arsenic | 0.06 |
| Copper | 0.008 |
| Manganese | 0.4 |
| Lead | 0.55 |
| Alumina | 1.5 |
| Magnesium oxide | 1.0 |
| Silica | 6.0 |

The pyrites may first be subjected to preliminary roasting in any conventional manner to drive off most of the sulphur content thereof, which may be utilized for manufacturing sulphuric acid, sulphite liquor and the like. After this preliminary roasting, the composition of the pyrites may be about as follows:—

|  | Percent |
|---|---|
| Iron | 42–44 |
| Zinc | 8– 9 |
| Sulphur | 4– 6 |
| Silica | 10–12 |

Before being subjected to the reduction process according to the principles of the present invention, the pyrites are subsequently dead-roasted to remove substantially the remaining sulphur, for instance, in a Dwight-Lloyd apparatus or the like. The following is approximately the composition of the pyrites after dead-roasting:

|  | Percent |
|---|---|
| Iron | 48–49 |
| Zinc | 9–10 |
| Sulphur | 0.10 |
| Silica | 12–14 |

Other materials containing zinc, iron, and sulphur can be treated by the process, the subject of this invention, in the same manner as residues from Meggen pyrites. Of course, a raw material nearly free from sulphur need not be roasted before it is reduced. Even in such cases however it may be of advantage to preheat the material before it enters the reduction furnace.

*Example*

15 tons of zinciferous dead-roasted residues of Meggen pyrites are melted down in a drum furnace after adding about 30% of cinders (non-bituminous coal, charcoal, or the like) and about 25% of lime, either with or without preheating. With rising temperature and slight motion of the furnace, the reduction of both the zinc and the iron contents takes place simultaneously. As the temperature within the furnace rises up to about 1700° C., the reduced sponge iron is melted and the iron or the steel is heated to its casting temperature. At these high temperatures the rest of the zinc is also reduced, and from any small amount of zinc sulphide, which may perhaps be present, the zinc is freed by reaction with the iron formed during the process. Both the tapped slag and the steel are free from zinc. Thus the 1200 kilograms of zinc contained in the input of 15 tons are completely driven off during the reduction and can be recovered as zinc oxide in the condensation apparatus, of the 7.5 tons iron contained in the raw material 7 tons are tapped in the form of steel.

We claim:
1. The process of treating zinciferous iron bearing material substantially free from sulphur which comprises effecting direct reduction of iron in said material while agitating the same in a rotary furnace to metallic solid iron and of zinc to volatile zinc, converting said reduced iron to the liquid state, recovering volatilized zinc, and withdrawing molten iron substantially free from zinc.

2. The process of treating zinciferous iron bearing material substantially free from sulphur which comprises effecting direct reduction of iron in said material while agitating the same in a rotary furnace to metallic solid iron and of zinc to volatile zinc with a solid reducing agent in the presence of a slag-forming material, converting said reduced iron to the liquid state, recovering volatilized zinc, and withdrawing molten iron substantially free from zinc.

3. The process of treating zinciferous iron bearing material which comprises converting iron and zinc thereof substantially to the oxidic form, subjecting said material to direct heat while agitating the same to effect direct reduction of iron to metallic solid iron and of zinc to volatile zinc with a solid reducing agent in the presence of a slag-forming material, continuing the heating to melt reduced iron and to substantially complete the volatilization of zinc, recovering said volatilized zinc, and withdrawing molten iron substantially free from zinc.

4. The process of treating zinciferous iron bearing material which comprises converting iron and zinc thereof substantially to the oxidic form, subjecting said material to direct heat in a revolving rotary tube-furnace in the presence of a solid reducing agent and a slag forming material to obtain metallic solid iron, volatile zinc and a slag, continuing the heating to convert said iron to the liquid state and to substantially complete volatilization of zinc, recovering volatilized zinc, and withdrawing molten iron and slag substantially free from zinc.

5. The process of treating zinciferous iron bearing material which comprises roasting said material to convert iron and zinc thereof to the oxidic form, mixing said roasted material with a solid reducing agent and fluxing material, subjecting said mixture to direct heat in a revolving rotary tube-furnace to effect direct reduction of iron in the mixture to metallic solid iron and of zinc to volatile zinc, continuing the heating to melt said reduced iron and to substantially complete the volatilization of zinc, recovering said volatilized zinc, and withdrawing said molten iron and slag substantially free from zinc.

6. The process of treating zinciferous iron ores which comprises roasting said ore to convert iron and zinc thereof to the oxidic form, mixing said roasted ore with a solid combustible and with a fluxing material, subjecting said mixture to direct heat in a revolving rotary tube-furnace to effect direct reduction of iron in the mixture to metallic solid iron and of zinc thereof to volatile zinc, continuing the heating to melt said reduced iron and to substantially complete the volatilization of zinc, recovering said volatilized zinc, and withdrawing said molten iron and slag substantially free from zinc.

7. The process of treating zinciferous iron ores which comprises roasting said ore to convert the iron and zinc thereof to the oxidic form, mixing said ore with a solid carbonaceous material, silica and lime, subjecting said mixture to direct heat in a revolving rotary tube-furnace to effect direct reduction of iron in the mixture to metallic solid iron and of zinc thereof to volatile zinc, continuing the heating to melt said reduced iron and to substantially complete the volatilization of zinc, recovering said volatilized zinc, and withdrawing said molten iron and slag substantially free from zinc.

FRITZ EULENSTEIN.
ADOLF KRUS.